April 25, 1939.     B. M. ANGELL     2,155,463
FREIGHT CAR
Filed May 13, 1937     2 Sheets-Sheet 1
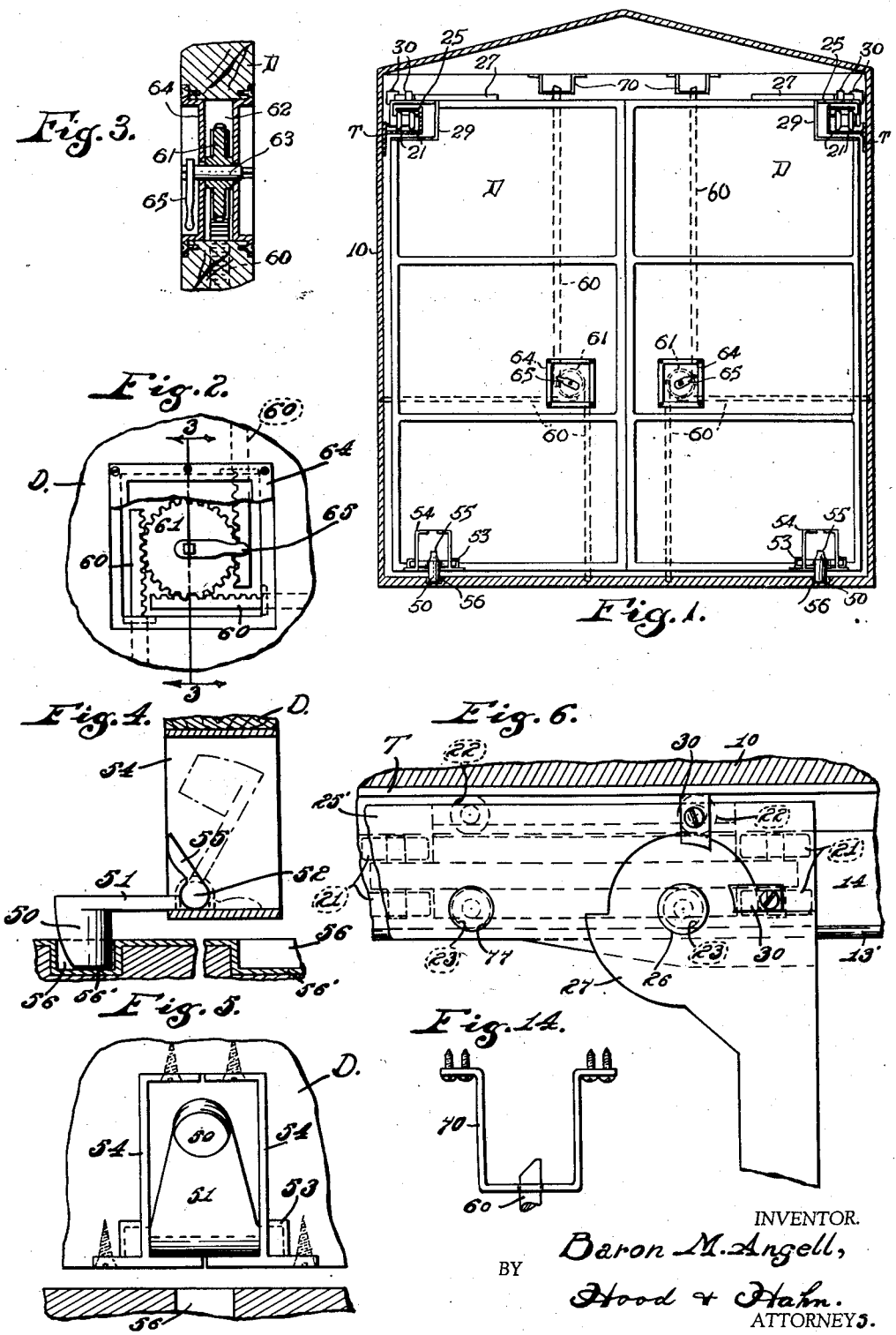
INVENTOR.
Baron M. Angell,
BY Hood & Hahn.
ATTORNEYS.

April 25, 1939.  B. M. ANGELL  2,155,463
FREIGHT CAR
Filed May 13, 1937  2 Sheets-Sheet 2
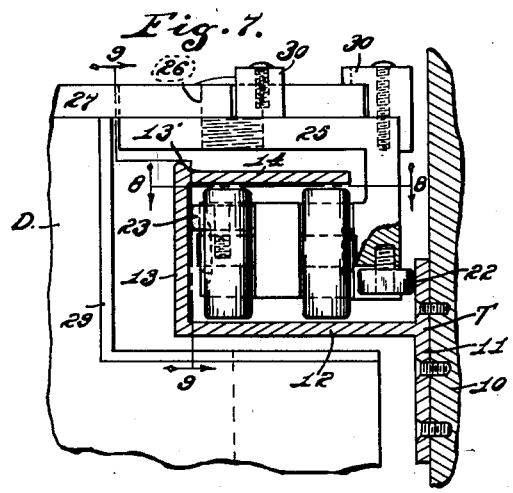
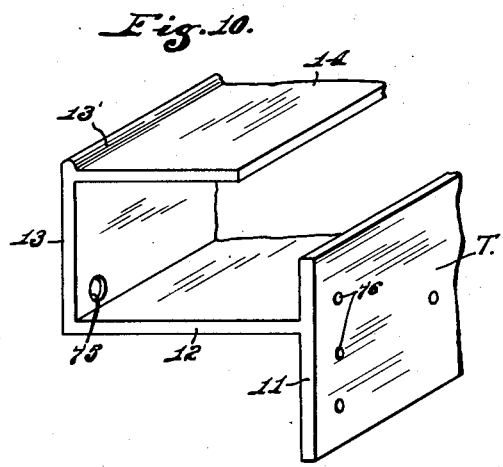
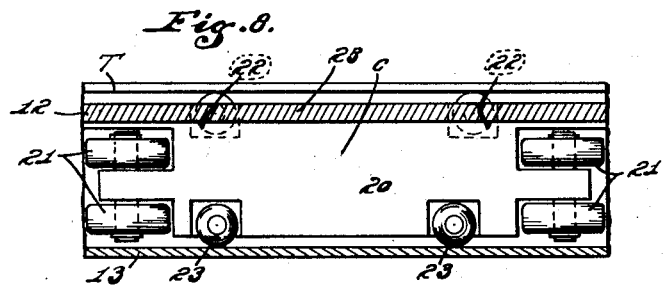
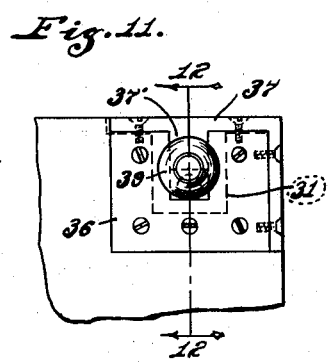
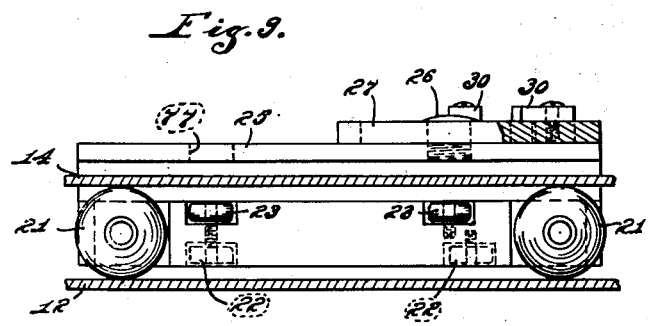
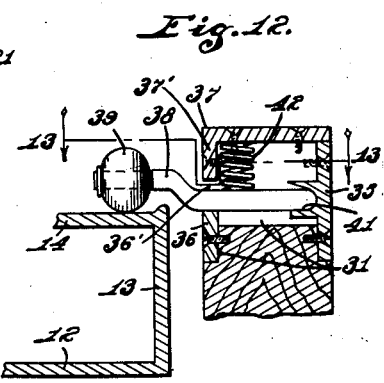
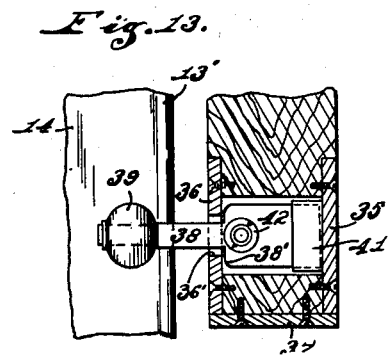
INVENTOR.
Baron M. Angell,
Hood & Hahn.
BY
ATTORNEYS.

Patented Apr. 25, 1939

2,155,463

UNITED STATES PATENT OFFICE 2,155,463

FREIGHT CAR

Baron M. Angell, Indianapolis, Ind.

Application May 13, 1937, Serial No. 142,349

10 Claims. (Cl. 105—376)

The object of my invention is to provide means, readily mountable in freight cars, by means of which the car contents may be segregated into less than carload quantities and also braced in such manner as to minimize shifting of contents, thereby protecting same from otherwise resulting damage.

The accompanying drawings illustrate my invention:

Fig. 1 is a transverse section of a common freight car, in which my improvements have been incorporated;

Fig. 2 a fragmentary elevation of bolt actuating means;

Fig. 3 a section on line 3—3 of Fig. 2;

Fig. 4 a vertical fragmentary section of one of the swinging doors or bulkhead sections D at the axis of swing thereof;

Fig. 5 an elevation of the parts shown in Fig. 4 with the hinge pintle in projected position;

Fig. 6 a fragmentary plan of Fig. 7 with the car roof removed;

Fig. 7 an end elevation of the trolley structure and adjacent bulkhead corner with the supporting track in vertical section;

Fig. 8 a section on line 8—8 of Fig. 7;

Fig. 9 a section on line 9—9 of Fig. 7;

Fig. 10 a fragmentary perspective of the track;

Fig. 11 an elevation of the upper outer corner of one of the swinging bulkheads;

Fig. 12 a section on line 12—12 of Fig. 11;

Fig. 13 a section on line 13—13 of Fig. 12; and

Fig. 14 a side elevation of a depending bracket.

Fundamentally my improvement comprises a bulkhead structure, conveniently having a width approximately equal to the half width of a freight car, so mounted within the car that it may be readily shifted longitudinally of the car for placement transversely of the car at various selective positions lengthwise of the car and, when so positioned, firmly anchored in place transversely of the car, and so supported that it may be readily swung to and from a position parallel with the sidewall of the car.

In the drawings 10 indicates an ordinary freight car near each upper corner of which is secured a track structure T which extends lengthwise of the interior of the car. The track T comprises the vertical plate 11 for direct attachment to the sidewall of the car 10, a horizontal plate 12, a vertical plate 13 rising from the outer edge of plate 12, and a horizontal plate 14 overlying plate 12, for a portion of its width, and arranged slightly below the upper edge 13' of plate 13, for a purpose which shall appear. Plates 12, 13, and 14 form a partially enclosed runway within which is slidably mounted a carrier C comprising the main body 20, end wheel pairs 21, 21 which lie between plates 12 and 14 and rest upon plate 12, side rollers 22, 22 on vertical axes adjacent the lower outer edge of the main body, and rollers 23, 23 adjacent the upper inner edge of the main body 20, rollers 22 engaging the face of plate 11 above plate 12 and rollers 23 engaging the inner face of plate 13 below plate 14. Main body 20 has an upper plate 25 which overlies the portion in which the rollers are mounted and also overlies plate 14 of track T. Plate 25 parallel with the length of body 20 has an overall dimension substantially equal to the overall length of carriage C and near one end of this plate, at 26, is pivoted a plate 27, the free end of which is attached to the upper edge of the swinging bulkhead or door D, the adjacent upper corner of the door being notched as indicated in Fig. 7, and reinforced with the L-shaped plate 29.

The pivoted end of the plate 27 is arc-shaped and overlaid by retaining fingers 30, 30 attached to bracket 25, as indicated in Fig. 7.

The bulkhead D is notched and chamfered, as indicated at 31, Figs. 11 to 13, near its upper free corner to receive plates 35, 36 and 37 which mate to form an enclosing and supporting structure for a finger 38 which, at its outer end, is provided with a ball roller 39 adapted to be projected upon the upper surface of plate 14, over edge 13', to support the free upper corner of the bulkhead when it is brought to a position parallel with the sidewall of the car. Plate 35, on its inner face, is provided with a pocket 41 to receive the inner rounded edge of finger 38. Plate 36 is notched at 36' at its upper edge (Fig. 12) to permit projection of finger 38 therethrough. Finger 38, midway of its length is shouldered at 38' and width 36' is too narrow to permit the shouldered portion of the finger 38 to pass therethrough. A compression spring 42 is interposed between the horizontal arm of plate 37 and the upper surface of finger 38. Plate 37 is L-shaped and its horizontal arm carries a depending tongue 37' which fits in the upper end of notch 36' and provides a stop to limit the forward and upward movement of finger 38.

As it is desirable that the bulkhead at times be freely movable lengthwise of the car and also at times freely swingable, I provide the movable pivot pintle 50 for the lower inner corner of the bulkhead. This pintle 50 is carried at the outer end of an arm 51 pivoted on a horizontal axis, at 52, in pockets 53, carried by casing elements 54, 54 recessed into the lower edge of the bulkhead D. Arm 51 is provided with a finger lever 55 by means of which the pintle pin 50 may be readily retracted into the shell formed by elements 54, 54, and thus retracted from pocket 56 formed in the floor of the car or an appropriate pocket plate 56', so that the pintle structure may be out of the way during car loading and bulkhead shifting lengthwise of the car.

The length of arm 51 is such that, when it is carried to the position shown in full lines in Fig. 4, the axis of the pin will be axially aligned with the pivot pin 26 of the plate 27.

Slidably mounted in guide passages formed within the bulkhead D, parallel to its vertical faces and extending upwardly, downwardly, and outwardly toward the free edge of the bulkhead, are bolts 60, 60, the inner ends of which are toothed and concentrated around the axis of a gear 61 within recess 62 of the bulkhead D. Gear 61 is carried by a shaft 63 journaled in plates 64 which serve as covers for recess 62. Secured to one end of shaft 63 is an operating lever 65.

When one of the bulkheads is swung to parallelism with a side of the car, its roller 39 will override ridge 13' and rest on the upper face of plate 14 (spring 42 yielding to permit that movement) so that the free end of the bulkhead will be supported on track T to facilitate ready longitudinal adjustment of the bulkhead in the car and to retain it against accidental swinging.

For longitudinal adjustment of a bulkhead, pintle pin 50 is retracted and then reset in an appropriate pocket.

Where the upper free end of the bulkhead does not closely approach the roof of the car, appropriate depending brackets 70 may be provided to receive the upper end of the upwardly extending bolt 60.

Any given bulk of commodities having been placed in one end of the car equipped with my devices, an opposed pair of bulkheads is longitudinally shifted into close proximity therewith. Pintles 50 are dropped into appropriate pockets 56 to firmly anchor the lower corners of the hinge edges of the bulkheads which are then swung transversely of the car into engagement with the loading. Bolts 60 are then projected to lock the bulkheads in transverse position, thereby confining the position of the load against undue displacement.

A series of segregated shipments may thus be readily packed in the car without danger of injury and mixing during transportation.

The plate 64 is depressed to form a recess for the lever 65 so that no portions of the locking mechanism project from the face of the bulkhead.

Plate 13 is perforated at various points 75 to afford access to fastening screws passed through perforations 76 in the upper region of plate 11.

Plate 25 is perforated at 77 to afford access to one of rollers 23, the other roller 23 being accessible through the perforation in which pin 26 is sealed.

Arm 51 and lever 55 are so arranged, as shown in Fig. 4, that, when pintle 50 is swung to retracted position, the weight biases the structure in its retracted position.

When a bulkhead has been swung to a position transversely of the car against a partial load, and then locked in position by the locking bolt 60, the pintle 50, being at the exposed face of the bulkhead, is swung up to the position shown in dotted lines in Fig. 4 so as to be out of the way to permit a second lot of commodities to be packed against the exposed face of the bulkhead.

I claim as my invention:

1. In a freight vehicle, a trolley track arranged longitudinally of the body of the vehicle adjacent an upper corner, a trolley carriage slidably mounted in said track, a bulkhead pivotally supported at its upper outer corner on a vertical axis on said carriage, pivot-forming anchoring means carried by the lower outer corner of said bulkhead and shiftable into and out of vertical alignment with said pivotal support of the upper corner of the bulkhead and into and out of pivotal engagement with the floor of the body, and bolting means carried by the bulkhead and shiftable into engagement with adjacent portions of the vehicle body to lock the same against swinging.

2. In a freight vehicle, a trolley track arranged longitudinally of the body of the vehicle adjacent an upper corner, a trolley carriage slidably mounted in said track and provided with transverse and vertical load-resisting elements contacting said track, a bulkhead pivotally supported at its upper outer corner on a vertical axis on said carriage, pivot-forming anchoring means carried by the lower outer corner of said bulkhead and shiftable into and out of vertical alignment with said pivotal support of the upper corner of the bulkhead and into and out of pivotal engagement with the floor of the body, and bolting means carried by the bulkhead and shiftable into engagement with adjacent portions of the vehicle body to lock the same against swinging.

3. Apparatus of the character specified in claim 1 wherein the track structure is provided with a horizontal plate overlying the trolley and flanked at its inner end by an upwardly projecting rib, and the free upper corner of the bulkhead is provided with a laterally projecting pin mounted for limited vertical yield and having at its outer end a roller adapted to ride upon the upper face of said overlying plate.

4. Apparatus of the character specified in claim 2 wherein the track structure is provided with a horizontal plate overlying the trolley and flanked at its inner end by an upwardly projecting rib, and the free upper corner of the bulkhead is provided with a laterally projecting pin mounted for limited vertical yield and having at its outer end a roller adapted to ride upon the upper face of said overlying plate.

5. An attachment for the free upper corners of swinging bulkheads comprising a plate with an open pocket on its inner face, an opposed plate having a perforation therethrough, a finger having one end swingably pocketed in said pocket projected through said perforation and provided with a roller at its outer end, and a spring mounted between said plates and biasing said finger in one direction relative to said perforation.

6. An attachment for the lower hinge corner of a swinging bulkhead comprising a casing mountable in said bulkhead, and a pintle-carrying arm pivoted upon a horizontal axis in said casing.

7. An attachment for the lower hinge corner of a swinging bulkhead comprising a casing mountable in said bulkhead and comprising a pair of mating elements each provided near its lower end with an inwardly opening pocket, and a pintle-carrying arm pivoted upon a horizontal axis in said casing and provided with oppositely projecting pivot means seatable in said pocket.

8. In a freight vehicle, a trolley track arranged longitudinally of the body adjacent an upper corner, a trolley carriage slidably mounted in said track and provided with transverse and vertical load-resisting elements contacting said track, a bulkhead pivotally supported at its upper outer corner on a vertical axis on said carriage, a finger carried by the bulkhead near its upper free corner and projecting laterally from the outer face of the bulkhead in position to ride upon the trolley track when the bulkhead is swung into parallelism with the side wall of the vehicle.

9. A track structure, comprising a vertical main plate, a horizontal plate springing from the main plate below its upper edge, a vertical plate rising from the outer edge of the horizontal plate, a second horizontal plate springing from the inner face of said vertical plate and overlying the first-mentioned horizontal plate for a portion of its width only, a U-shaped carriage slidably mounted in said track with one arm between the horizontal plates of the track and one arm overlying the upper plate of the track, the first-mentioned arm of the said carriage having vertical load-resisting rollers engaging the upper face of the first-mentioned horizontal plate of the track, lateral load-resisting rollers engaging the inner face of the main plate of the track, and lateral load-resisting rollers engaging the inner face of the outer vertical plate of the track.

10. A track structure, comprising a vertical main plate, a horizontal plate springing from the main plate below its upper edge, a vertical plate rising from the outer edge of the horizontal plate, a second horizontal plate springing from the inner face of said vertical plate below the upper edge thereof and overlying the first-mentioned horizontal plate for a portion of its width only, a U-shaped carriage slidably mounted in said track with one arm between the horizontal plates of the track and one arm overlying the upper plate of the track, the first-mentioned arm of said carriage having vertical load-resisting rollers engaging the upper face of the first-mentioned horizontal plate of the track, lateral load-resisting rollers engaging the inner face of the main plate of the track, and lateral load-resisting rollers engaging the inner face of the outer vertical plate of the track.

BARON M. ANGELL.